No. 845,243. PATENTED FEB. 26, 1907.
J. R. LILLEY.
COUPLING.
APPLICATION FILED MAY 24, 1906.
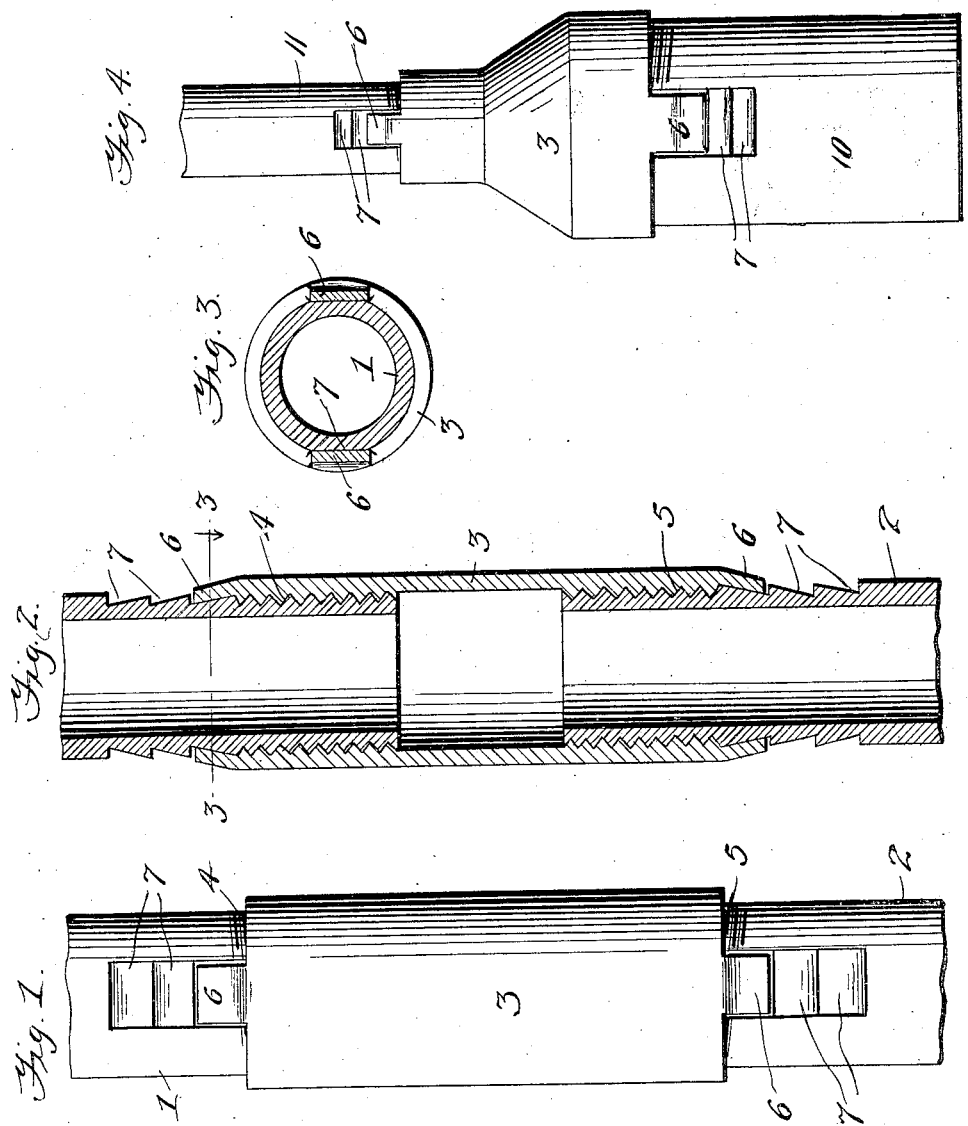

UNITED STATES PATENT OFFICE.

JOHN R. LILLEY, OF COATESVILLE, PENNSYLVANIA.

COUPLING.

No. 845,243.     Specification of Letters Patent.     Patented Feb. 26, 1907.

Application filed May 24, 1906. Serial No. 318,533.

*To all whom it may concern:*

Be it known that I, JOHN R. LILLEY, a citizen of the United States, residing at Coatesville, in the county of Chester and State of Pennsylvania, have invented certain new and useful Improvements in Couplings; and I do declare the following to be a full, clear, and exact description of the invention, such as will enable others skilled in the art to which it appertains to make and use the same.

My invention relates to improvements in couplings for pipes, rods, and the like; and it consists in the novel construction, combination, and arrangement of parts hereinafter described and claimed.

The object of the invention is to provide a simple, inexpensive, and efficient screw-threaded coupling or connection for pipes, rods, and the like which will effectively lock them together, so that they cannot work loose.

The above and other objects, which will appear as the nature of the invention is better understood, are accomplished by the construction illustrated in the accompanying drawings, in which—

Figure 1 is a side elevation of my improved coupling, showing it connecting two pipes. Fig. 2 is a longitudinal sectional view through the same. Fig. 3 is a transverse sectional view, and Fig. 4 is a view showing the coupling connecting the cylinder of a well-pump to its supporting rod or pipe.

Referring to the drawings by numeral, 1 and 2 denote sections of pipes, rods, or the like which are detachably secured or locked together by my improved coupling 3. As shown, the latter is in the form of a cylindrical sleeve which has its bore or interior at its opposite ends oppositely screw-threaded to receive the oppositely-screw-threaded ends 4 5 of the two pipe or rod sections 1 2. At each of the ends of the sleeve or coupling 3 are formed one or more longitudinally-extending integral tongues or projections 6, which, after the sections 1 2 have been screwed into the opposite ends of the coupling, are adapted to be bent down into seats or recesses 7, suitably arranged upon the outer faces of the sections 1 2, so that the three parts 1 2 3 will be locked together against independent rotation.

The seats 7 may be in the form of flattened portions on the pipe or rod sections, or, as shown in the drawings, in the form of series of angular notches or recesses, into which the tongues 6 may be bent after the parts are properly connected.

Any number of the tongues 6 may be employed, and they may be located at any points upon the coupling.

In Fig. 4 of the drawings the coupling is shown adapted for use in connecting a well-pump cylinder 10 upon its supporting or suspending rod or pipe 11. These elements 10 11 have their opposing ends engaged with the right and left screw-threads in the opposite ends of the coupling.

The construction, use, and advantages of the invention will be readily understood from the foregoing description, taken in connection with the accompanying drawings.

It will be seen that the coupling may be used for connecting the pipes, tubes, rods, and the like of any description whatever and that they may be made of any desired size, shape, and material.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. The combination with two screw-threaded elements, of a coupling-sleeve internally screw-threaded to receive said elements, and integral tongues formed upon the opposite ends of said sleeve and bent into seats formed in said elements, for the purpose set forth.

2. The combination with pipe or rod sections having oppositely-screw-threaded ends and seats formed in their outer faces, of a coupling-sleeve having its opposite ends interiorly screw-threaded in opposite directions, and tongues upon said sleeves adapted to be bent into the seats of said sections, substantially as shown and described.

In testimony whereof I have hereunto set my hand in presence of two subscribing witnesses.

JOHN R. LILLEY.

Witnesses:
    JNO. K. LILLEY,
    HARRY S. WOODWARD.